United States Patent [19]

Shiozaki et al.

[11] 4,020,260

[45] Apr. 26, 1977

[54] NOVEL HYDROCARBON RESINS COMPRISING 1,3-PENTADIENE, 1,5,9-CYCLODODECATRIENE AND OPTIONALLY MONOOLEFIN

[75] Inventors: Shozo Shiozaki; Yonesaku Shinohara, both of Yokohama; Takeo Miyake, Fujisawa, all of Japan

[73] Assignee: Nippon Zeon Co., Ltd., Tokyo, Japan

[22] Filed: Mar. 10, 1975

[21] Appl. No.: 557,128

[30] Foreign Application Priority Data

Mar. 12, 1974 Japan .................................. 49-28384

[52] U.S. Cl. .................................... 526/237; 260/5; 526/308; 528/490; 528/500

[51] Int. Cl.$^2$ .................. C08F 236/04; C08L 7/00; C08F 4/00; C08F 232/00

[58] Field of Search ....................... 260/80.7, 85.3 R

[56] References Cited

UNITED STATES PATENTS

| | | | |
|---|---|---|---|
| 3,509,239 | 4/1970 | Tindall | 260/85.3 R |
| 3,577,398 | 5/1971 | Pace et al. | 260/85.3 R |
| 3,778,420 | 12/1973 | Brown et al. | 260/80.7 |
| 3,813,357 | 5/1974 | St. Cyr | 260/80.7 |
| 3,853,825 | 12/1974 | St. Cyr | 260/85.3 R |
| 3,867,361 | 2/1975 | Calderon et al. | 260/88.2 |
| 3,960,823 | 6/1976 | Komai et al. | 526/237 |

OTHER PUBLICATIONS

Calderon et al., J.P.S. Pt A-1, 2209-2217, (1967), "Ring Opening Polymerization of Unsat. Aucyclic Compds."

*Primary Examiner*—Joseph L. Schofer
*Assistant Examiner*—Herbert J. Lilling
*Attorney, Agent, or Firm*—Sherman & Shalloway

[57] ABSTRACT

Hydrocarbon resins comprising about 95-35% by weight of units derived from 1,3-pentadiene, about 1-50% by weight of units derived from cyclododecatriene, and 0-about 40% by weight of units derived from at least one monoolefin containing 5 carbon atoms, having a softening point of from about 100° to about 160° C., and being substantially gel-free. The hydrocarbon resins can be prepared by polymerizing a monomeric mixture comprising 1,3-pentadiene in the presence of a Friedel-Crafts type metal halide catalyst, said monomeric mixture comprising about 95-35% by weight of 1,3-pentadiene, about 1-50% by weight of cyclododecatriene, and 0-about 50% by weight of at least one monoolefin containing 5 carbon atoms.

5 Claims, No Drawings

NOVEL HYDROCARBON RESINS COMPRISING 1,3-PENTADIENE, 1,5,9-CYCLODODECATRIENE AND OPTIONALLY MONOOLEFIN

This invention relates to novel hydrocarbon resins and a process for preparing the same. More particularly, the invention relates to the hydrocarbon resins comprising in their polymer chains units derived from 1.3-pentadiene, units derived from cyclododecatriene, and optionally units derived from a monoolefin containing five carbon atoms; and to a process for preparing such hydrocarbon resins which comprises polymerizing monomeric mixtures of 1,3-pentadiene, cyclododecatriene, and optionally the monoolefin containing five carbon atoms, in the presence of acidic metal halide catalyst.

It has heretofore been known that the cationic polymerization of 1,3-pentadiene gives polymers exhibiting various different properties. These polymers may be in the form of liquid, gel, or the like, and are employable for specific uses depending on their specific properties. However, they were hardly found valuable in the industrial field in which rosin and its derivatives, terpene resin or the like have been used. Recently various attempts have been made to produce improved polymers of 1,3-pentadiene, with the result of development of such processes as follows:

A process comprising copolymerizing 1,3-pentadiene and 2-methyl-2-butene (U.S. Pat. No. 3,577,398), A process comprising copolymerizing 1.3-pentadiene, 2-methyl-1-butene, and 2-methyl-2-butene (U.S. Pat. No. 3,813,357), and A process comprising copolymerizing 1,3-pentadiene and cyclopentene (Japanese Patent Gazette No. 58077/73).

The resinous polymers obtained by such processes as above have been receiving attention as useful industrial substitutes for rosin or terpene resins. There is a drawback in these processes, however, in that attempts to make the resins having high softening points meet such difficulties as easy gelation or limitations on the polymerization conditions, although the hydrocarbon resins having low softening points can be produced with advantage.

Hydrocarbon resins having high softening points generally attract attention as valuable industrial material, because they exhibit excellent peel strength and cohesive strength, when used as an adhesive agent as mixed with rubber. As a process for making such a resin, a process for copolymerizing a monomeric mixture of 1,3-pentadiene and 2-methyl-2-butene with dicyclopentadiene has been developed (Japanese Patent Gazette No. 23916/72). However, the hydrocarbon resins obtained by the process have many deficiencies. For example, accompanying a rise in softening point, their melt viscosity also rises rapidly, color tone is impaired, gelling tendency increased, and adhesive strength decreased when as an adhesive agent.

An object of this invention is to provide novel hydrocarbon resins exhibiting high softening point, excellent color tone, and being gel-free; and also a process for making the same.

Another object of the invention is to provide the hydrocarbon resins which exhibit excellent adhesive strength when used as an adhesive agent as mixed with rubber; and a process for making the same.

The present inventors found that the above objects of the invention can be achieved by the cationic polymerization of 1,3-pentadiene and cyclododecatriene, and if necessary, also the monoolefin containing five carbon atoms, and by the resulting hydrocarbon resins having excellent properties heretofore not achieved.

Thus, according to the invention, the substantially gel-free hydrocarbon resins having a softening point of about 100° – 160° C., and comprising
 about 95–35% by weight of the units derived from 1,3-pentadiene,
 about 1–50% by weight of the units derived from cyclododecatriene, and
 0– about 40% by weight of the units derived from at least one monoolefin containing five carbon atoms,
is provided as the product meeting the foregoing object, which is prepared by polymerizing a mixture comprising about 95–35% by weight of 1,3-pentadiene, about 1–50% weight of cyclododecatriene, and 0– about 50% by weight of at least one monoolefin containing five carbon atoms, in the presence of a Friedel-Crafts type acidic metal halide catalyst.

The monomeric mixture useful for the invention thus comprises 1,3-pentadiene and cyclododecatriene, and if desired, at least one monoolefin containing five carbon atoms as above. The composition of the mixture is such that, about 95–35% by weight, preferably 90–40% by weight, inter alia, 85–45% by weight, of 1,3-pentadiene; about 1–50% by weight, preferably 2–40% by weight, inter alia, 5–30% by weight of cyclododecatriene; and 0– about 50% by weight, preferably 5–30% by weight, inter alia, 10 – 25% by weight, of at least one monoolefin containing five carbon atoms; are contained.

According to the invention, the higher the cyclododecatriene content in the monomeric mixture within the above-specified range, the higher the softening point of the product hydrocarbon resin. The high softening point hydrocarbon resin in accordance with the invention is substantially gel-free, exhibits little color tone deterioration and lower melt viscosity than that of conventionally prepared high softening point hydrocarbon resins, and is unique in those features. Such unique high softening point hydrocarbon resin cannot be obtained when cyclododecatriene is replaced by other cycloolefin such as cyclooctadiene or vinyl cyclohexene. Thus the present invention employing cyclododecatriene as the comonomer achieves remarkable effect heretofore unknown, but when the cyclododecatriene content in the monomeric mixture exceeds 50% by weight, such objectionable phenomena as conspicuous drop in the rate of reaction and color tone deterioration take place. Such a high cyclododecatriene content neither is acceptable from economical standpoint.

According to the invention, at least one monoolefin containing five carbon atoms which is copolymerizable with 1,3-pentadiene and cyclododecatriene, may be copolymerized in addition to said two components, if so desired. Presence of such monoolefin in the monomeric mixture stabilizes the polymerization reaction, and more effectively inhibits the formation of gel. Examples of useful monoolefins include cyclopentene, 2-methyl-2-butene, 1-pentene, 2-pentene and the like, cyclopentene being the most preferred. When the amount of such monoolefin or monoolefins exceeds the already specified range, however, such drawbacks are caused as the drop in the rate of reaction and lowering in the softening point of the product resin. Accordingly, in the present invention, in order to improve the reactivity and raising the softening point, it is necessary to keep the sum content of cyclododecatriene and the monoolefin containing five carbon atoms in the monomeric mixture less than 65% by weight, that is, to maintain the 1,3-pentadiene content of at least 35% by weight, preferably at least 40% by weight, inter alia, at least 45% by weight.

The monomeric mixture may further contain, in addition to 1,3-pentadiene, cyclododecatriene and at least one monoolefin containing five carbon atoms, other copolymerizable unsaturated hydrocarbon or hydrocarbons, within the range not essentially detrimental to the effect of this invention. Specific examples of such unsaturated hydrocarbons include aliphatic mono- and diolefins containing 4–8 carbons such as butene, hexene, diisobutylene, butadiene and isoprene; cycloolefins such as cyclopentadiene, methylcyclopentadiene and dicyclopentadiene; vinyl substituted aromatic hydrocarbons such as, α-methylstyrene and vinyltoluene; and terpenes such as α-pinene, β-pinene, and dipentene.

The monomeric mixture as specified above can be readily obtained by mixing $C_5$ fraction composed mainly of 1,3-pentadiene, which is by-produced during cracking of naphtha, with cyclododecatriene, while obviously it may be prepared by mixing each independent components. Cyclododecatriene is normally obtained by trimerization of 1,3-butadiene, but the means for its preparation is not critical. The fraction composed mainly of 1,5,9-cyclododecatriene is not necessarily refined, but can be used in this invention as it is.

The Friedel-Crafts type acidic metal halide catalyst to be employed in this invention typically include fluorides, chlorides, bromides and iodides of metals such as aluminum, boron and iron. Inter alia, aluminum halides such as aluminum chloride and bromide, and boron trifluoride are particularly preferred, aluminum chloride being the most preferred. The use of boron trifluoride.etherate, an alkylaluminum dihalide or the like, which is liquid at ambient temperature, will produce a liquid polymer. Titanium tetrachloride is remarkably low in polymerizing activity as a Friedel-Crafts type catalyst.

In view of the fact that the contact of the monomeric reaction according to this invention, the catalyst may be used in the form of particles having a mesh size of usually 5–200, preferably 20–200. However, these mesh sizes are not limitative, and larger and smaller particles may also be used. The catalyst must be used in the amount sufficient to allow satisfactory progress of polymerization reaction, which is normally 0.1–5 parts by weight, preferably 0.5–2.5 parts by weight, per 100 parts by weight of the monomeric mixture. The catalyst may be added to the monomeric mixture, or the mixture to the catalyst, but if desired, both of them may concurrently be introduced to a reactor. The polymerization reaction, whether effected in a batch or continuous fashion, is carried out in the known manner.

The reaction is normally exothermic. In order to advantageously control the polymerization temperature, therefore, it is preferred to use a solvent which is inert to the reaction. The typical examples of such solvent include aromatic hydrocarbons such as benzene, toluene, xylene and monochlorobenzene; aliphatic hydrocarbons such as pentane, hexane and heptane; and alicyclic hydrocarbons such as cyclohexane. However, the use of the aliphatic hydrocarbons as the solvent in the reaction of the monomeric mixture of high 1,3-pentadiene concentration may in certain cases give gel-like polymer product. It is recommended, therefore, to use the solvent containing at least 50% by weight of an aromatic hydrocarbon, in order to avoid such inconvenience. The solvent is used normally at the ratio of 20–1000 parts by weight, preferably 50–500 parts by weight, per 100 parts by weight of the monomeric mixture.

The polymerization is effected normally at −20°–100° C., preferably 0°–80° C., and the pressure of the reaction system may be above or below the atomspheric pressure. The reaction time neither is a critical factor, and is variable normally within the range of several seconds to twelve hours, or even over a wider range.

The polymer formed can be readily separated through the treatments and drying according to the accepted practices.

The hydrocarbon resin produced by the process as described above comprises in its polymer chain about 95–35% by weight, preferably 90–40% by weight, of units derived from 1,3-pentadiene; about 1–50% by weight, preferably 2–'% by weight, of units derived from cyclododecatriene; and 0–40% by weight, preferably 4–25% by weight, of units derived from the monoolefin containing 5 carbon atoms. (Note: When the monoolefin content in the monomeric mixture ranges from 0–50% by weight, preferably 5–30% by weight, as aforesaid, the formed resin contains 0–40% by weight, preferably 4–25% by weight, of the monoolefin units, because the monoolefins have a lower reactivity than those of 1,3-pentadiene and cyclododecatriene.) The hydrocarbon resin is substantially gel-free, and has a Gardner color of not more than 6 as determined by ASTM D-1544-63 T, and a softening point of 100°–160° C., preferably 100°–150° C. as determined according to the prescription in JIS K-2531. The hydrocarbon resin furthermore is soluble in aliphatic, aromatic, or halogenated hydrocarbon solvents such as pentane, hexane, benzene, xylene, chloroform, or carbon tetrachloride, and is miscible with natural rubber and other known synthetic rubbers; synthetic resins such as polyethylene, or an ethylene-vinyl acetate copolymer; natural resins such as polyterpene or rosin; and various waxes.

Thus the hydrocarbon resin produced according to the invention is gel-free in spite of the high softening point, exhibits good color tone and excellent adhesive strength in addition to the high peel strength and cohesive strength, when used as an adhesive agent as mixed with rubber. Consequently, the hydrocarbon resin is well adapted for providing an adhesive composition for making adhesive tapes, as mixed with natural rubber or various other synthetic rubbers. It is also useful as a tackifier for imparting tackiness to unvulcanized rubber. The resin is also useful in the field of hot-melt adhesive agent and ink.

Hereinafter the invention will be more specifically described with reference to the following working Examples, in which the parts are by weight unless otherwise specified.

EXAMPLE 1

A 3-liter glass flask was charged with 800 g of benzene and 9 g of aluminum chloride of about 40 mesh in particle size. The mixture was stirred and maintained at 40° C. To the mixture then 700 g of the monomeric mixture of the composition shown in Table 1 was continuously added over the course of 120 minutes. Because the temperature of the reaction mixture tended to rise due to the exothermic reaction, the temperature was maintained at 55° C. by cooling. After completion of the addition, the polymerization system was further stirred for an additional 30 minutes while its temperature was maintained at 55° C. Then the aluminum chloride catalyst was decomposed by adding to the reaction mixture 35 ml of an equi-volume mixture of methanol and 28% aqueous ammonia. The catalyst particles inactivated by the decomposition were removed by filtration, and the filtrate was transferred into a 3-liter glass flask. While blowing nitrogen gas thereinto, the flask was heated so that the unreacted hydrocarbon and solvent were distilled off. The heating was continued until the temperature rose to 230° C. To remove the low polymers produced by the reaction and the residual solvent, saturated steam was blown into the system, until the distillate became substantially free of an oily layer. Upon confirming that, feeding of steam was stopped, and the molten residue in the flask was withdrawn onto an aluminum tray. Allowing the residue to cool off to room temperature, a yellow resinous material was obtained.

Each of the hydrocarbon resins obtained was examined for its softening point (determined by the ring and ball method prescribed in JIS K-2531) and Gardner color (prescribed in ASTM D-1544-63T). Also the catalyst residue separated by the filtration in each run was examined to determine the gel content in the resin. The results were as shown in Table 2.

The following observations can be made from the above results. (1) When cyclododecatriene is copolymerized according to the process of this invention, resins having high softening point can be produced while preventing formation of gel or color deterioration. (2) In contrast thereto, copolymerization of other cycloolefin such as vinylcyclohexene or 1,5-cyclooctadiene achieves substantially no effect of improving the softening point of the product resin. (3) Copolymerization of dicyclopentadiene, which is a comonomer known for improving softening point, does raise the softening point of the product resin as its copolymerization ratio increases, but simultaneously the color tone is impaired, and formation of gel becomes conspicuous.

Also as to the products of Experiments No. 2 (Example of this invention) and No. 4 (Control), the melt viscosity (200° C., Brookfield viscosimeter) was measured, with the result respectively of 990 cps and 1140 cps. This clearly demonstrates that according to the invention the resin having a low melt viscosity in spite of its high softening temperature can be obtained.

EXAMPLE 2

The polymerization was carried out in the same manner as in Example 1, except that the amount of aluminum chloride was made 12 grams, and the composition of the monomeric mixture was varied as indicated in Table 3. Thus yellow resinous materials were obtained. The results of measurements were as shown in Table 4. Note that in Table 4, "polymer-constituting units" is the value calculated based on the fed monomeric composition and the recovered unreacted monomeric composition.

Table 1

| Monomeric Component | Mixture A part | % | B part | % | C part | % | D part | % | E part | % | F part | % |
|---|---|---|---|---|---|---|---|---|---|---|---|---|
| 1,3-Petadiene | 72.7 | 79.4 | 69.3 | 75.4 | 65.9 | 71.4 | 65.9 | 71.4 | 65.9 | 71.4 | 65.9 | 71.4 |
| Cyclopentene | 18.8 | 20.6 | 17.9 | 19.6 | 17.2 | 18.6 | 17.2 | 18.6 | 17.2 | 18.6 | 17.2 | 18.6 |
| 1,5,9-Cyclododecatriene | — | — | 4.6 | 5.0 | 9.2 | 10.0 | — | — | — | — | — | — |
| Dicyclopentadiene | — | — | — | — | — | — | 9.2 | 10.0 | — | — | — | — |
| 1,5-Cyclooctadiene | — | — | — | — | — | — | — | — | 9.2 | 10.0 | — | — |
| Vinylcyclohexene | — | — | — | — | — | — | — | — | — | — | 9.2 | 10.0 |
| Saturated hydrocarbon of 5 – 6 carbons | 5.2 | | 5.0 | | 4.7 | | 4.7 | | 4.7 | | 4.7 | |
| Unsaturated hydrocarbon of 5 – 6 carbons | 3.3 | | 3.2 | | 3.0 | | 3.0 | | 3.0 | | 3.0 | |
| Total | 100 | 100 | 100 | 100 | 100 | 100 | 100 | 100 | 100 | 100 | 100 | 100 |

Table 2

| Experiment No. | Control 1 | Example 2 | 3 | 4 | Control 5 | 6 |
|---|---|---|---|---|---|---|
| Monomeric mixture | A | B | C | D | E | F |
| Yield (%) | 84.2 | 88.2 | 86.3 | 85.3 | 87.5 | 81.7 |
| Yield of low polymers (%) | 7.6 | 8.8 | 12.3 | 10.5 | 9.2 | 6.8 |
| Presence of gel | No | No | No | Yes | No | No |
| Softening point (° C.) | 109.0 | 123.0 | 124.5 | 117.5 | 114.0 | 106.5 |
| Gardner Color | 4 | 4 | 4 | 6 | 4 | 4 | position.

Table 3

| Monomeric Component | Mixture A Part | % | G Part | % | H Part | % | I Part | % |
|---|---|---|---|---|---|---|---|---|
| 1,3-Pentadiene | 72.7 | 79.4 | 62.6 | 67.6 | 59.2 | 63.7 | 44.8 | 47.6 |
| Cyclopentene | 18.8 | 20.6 | 16.1 | 17.4 | 15.1 | 16.3 | 11.5 | 12.4 |
| 1,5,9-Cyclododeca- | | | | | | | | |

Table 3-continued

| Monomeric Component | Mixture | A Part | % | G Part | % | H Part | % | I Part | % |
|---|---|---|---|---|---|---|---|---|---|
| triene | | — | — | 13.9 | 15.0 | 18.6 | 20.0 | 37.6 | 40.0 |
| Saturated hydrocarbon of 5 – 6 carbons | | 5.2 | | 4.5 | | 4.3 | | 3.7 | |
| Unsaturated hydrocarbon of 5 – 6 carbon | | 3.3 | | 2.9 | | 2.8 | | 2.4 | |
| Total | | 100 | 100 | 100 | 100 | 100 | 100 | 100 | 100 |

Table 4

| Experiment No. | Control 7 | 8 | Example 9 | 10 |
|---|---|---|---|---|
| Monomeric mixture | A | G | H | I |
| Polymer-constituting units (%) | | | | |
| 1,3-Pentadiene | 82 | 70 | 66 | 52 |
| Cyclopentene | 16 | 14 | 13 | 7 |
| 1,5,9-Cyclododecatriene | — | 14 | 19 | 40 |
| Others | 2 | 2 | 2 | 1 |
| Yield (%) | 87.5 | 86.2 | 86.2 | 83.4 |
| Yield of low polymer (%) | 10.2 | 12.5 | 13.0 | 16.1 |
| Presence of gel | No | No | No | No |
| Softening point (° C.) | 110.0 | 130.5 | 136.5 | 145.0 |
| Gardner Color | 4 | 4 | 4 | 5 |

From the above results it can be understood that with the increase in copolymerization ratio of cyclododecatriene, the softening point of the produced resin also rises. However, there is a tendency observable that the color tone is somewhat impaired and the reaction rate is decreased. It can be understood, therefore, the copolymerization ratio of cyclododecatriene is appropriately specified to be less than 50% by weight.

REFERENTIAL EXAMPLE

This is to evaluate the utility of the hydrocarbon resin of this invention as a component to be blended into an adhesive composition.

Eighty parts of the resin specified in Table 5 was dissolved in 900 parts of toluene, and to the solution further 100 parts of natural rubber (pale crepe, Mooney viscosity, $ML_{1+4}/_{100°C.60}$) was added and dissolved. The solution was applied onto a cellophane tape to a thickness of 25μ. The cohesive strength, 180° peel strength, tackiness of the cellophene tape, and the compatibility between the rubber and resin were examined, with the results shown also in Table 5.

Incidentally, the methods of measurements of the specified properties were as follows:

Cohesive strength

Following the prescriptions in JIS Z-1524, the sample was stuck onto a stainless steel plate which had been polished with No. 280 waterproof abrasive paper, with the contact area of 100 × 25 mm, and to which a load of 1 kg was applied at 25° C. The length of time required for the load to cause the shear of 1 mm to the sample was measured.

180° Peel Strength

Following the prescription in JIS Z-1522, a 25 × 100 mm sample was stuck onto the stainless steel plate which had been finished as above, and then peeled off at 25° C. at a rate of 200 mm/min. at the angle of 180°. The strength required for the peeling was measured.

Tackiness

In accordance with J. Dow's method [Proc. Inst. Rub. Ind., 1, 105 (1954)], 10-cm long sample adhesive tape was stuck onto a stainless steel sheet inclined by 30°, and from the higher position of the slope distant from the upper edge of the tape by 10 cm, stainless steel balls of 32 different sizes ranging from 1/32 inch to 1 inch in diameter were tumbled at the initial speed of zero. The diameter of the greatest ball which stopped on the adhesive tape is given as the tackiness value.

Table 5

| Resin | Resin of this invention | | | | | Control resin | | | Ter-* pene Resin |
|---|---|---|---|---|---|---|---|---|---|
| | Example No.2 | Example No.3 | Example No.8 | Example No.9 | Example No.10 | Example No.1 | Example No.7 | | |
| 180° Peel strength (g/inch) | 686 | 737 | 737 | 737 | 711 | 525 | 550 | | 770 |
| Thickness (1/32 inch) | 14 | 15 | 12 | 13 | 10 | 5 | 4 | | 17 |
| Cohesive strength (time/mm) | 77 | 58 | 82 | 75 | 160 | 50 | 50 | | 35 |
| Compatibility | good | good | good | good | good | good | good | | good |

Table 5-continued

| Resin | Resin of this invention | | | | | Control resin | | Ter-* pene Resin |
|---|---|---|---|---|---|---|---|---|
| | Example No.2 | Example No.3 | Example No.8 | Example No.9 | Example No.10 | Example No.1 | Example No.7 | |
| with rubber | | | | | | | | |

*YS-Resin P No. 1150 (product of Yasuhara Resin Co., softening point, 115° C.)

From the results shown in Table 5, it can be understood that when the hydrocarbon resins of this invention are used, the adhesive agent exhibits excellent peel strength, cohesive strength and tackiness, compared with the case of using resins of Controls not copolymerized with cyclododecatriene. It is particularly interesting to note that the resins of this invention supply high adhesive strength, in spite of their high softening point. The data in Table 5 also demonstrate that the adhesive agents incorporated with the resins of this invention generally exhibit approximately equivalent peel strength to, and for higher cohesive, strength than, those of the adhesive agent incorporated with terpene resin, which is the resin known for its excellent peel strength.

We claim:

1. A hydrocarbon resin having a softening point of from about 100° to about 160° C and being substantially gel-free comprising about
   95–35% by weight of units derived from 1,3-pentadiene,
   1–50% by weight of units derived from 1,5,9-cyclododecatriene, and
   0–40% by weight of units derived from at least one monoolefin containing 5 carbon atoms, said resin obtained by polymerizing a monomeric mixture comprising about
   95–35% by weight of 1,3-pentadiene,
   1–50% by weight of 1,5,9-cyclododecatriene, and
   0–50% by weight of at least one monoolefin containing 5 carbon atoms,
in the presence of a solvent containing at least 50% by weight of an aromatic hydrocarbon and about 0.1–5 parts by weight, per 100 parts by weight of the monomeric mixture of a Friedel-Crafts type metal halide catalyst selected from aluminum halide and boron trifluoride.

2. The hydrocarbon resin of claim 1 having a softening point of from about 100° to about 150° C comprising about
   90–40% by weight of units derived from 1,3-pentadiene
   2–40% by weight of units derived from 1,5,9-cyclododecatriene, and
   4–25% by weight of units derived from at least one monoolefin containing 5 carbon atoms, said resin obtained by polymerizing a monomeric mixture comprising about
   90–40% by weight of 1,3-pentadiene,
   2–40% by weight 1,5,9-cyclododecatriene, and
   5–30% by weight of at least one monoolefin containing 5 carbon atoms
in the presence of a solvent containing at least 50% by weight of an aromatic hydrocarbon and about 0.1–5 parts by weight, per 100 parts by weight of the monomeric mixture of a Friedel-Crafts type metal halide catalyst selected from aluminum halide and boron trifluoride.

3. The hydrocarbon resin of claim 2 wherein said monoolefin is at least one member selected from the group consisting of cyclopentene, 2-methyl-2-butene, 1-pentene and 2-pentene.

4. The hydrocarbon resin of claim 2 wherein said monoolefin is cyclopentene.

5. The hydrocarbon resin of claim 2, wherein said resin is obtained by polymerizing a monomeric mixture comprising about
   85–45% by weight of 1,3-pentadiene,
   5–30% by weight of 1,5,9-cyclododecatriene, and
   10–25% by weight of at least one monoolefin containing 5 carbon atoms
in the presence of a solvent containing at least 50% by weight of an aromatic hydrocarbon and about 0.1–5 parts by weight, per 100 parts by weight of the monomeric mixture of a Friedel-Crafts type metal halide catalyst selected from aluminum halide and boron trifluoride.

* * * * *